United States Patent
Caplan et al.

(10) Patent No.: US 6,520,347 B2
(45) Date of Patent: Feb. 18, 2003

(54) RACK FOR COMPACT DISCS

(75) Inventors: David Caplan, Las Vegas, NV (US); Charles E. Taylor, Sebastopol, CA (US)

(73) Assignee: Sharper Image Corporation, San Francisco, CA (US)

(*) Notice: Subject to any disclaimer, the term of this patent is extended or adjusted under 35 U.S.C. 154(b) by 0 days.

(21) Appl. No.: 09/873,807

(22) Filed: Jun. 4, 2001

(65) Prior Publication Data

US 2001/0045400 A1 Nov. 29, 2001

Related U.S. Application Data

(63) Continuation of application No. 09/240,308, filed on Jan. 29, 1999, now abandoned.

(51) Int. Cl.$^7$ ................................................ A47G 29/00
(52) U.S. Cl. ....................... 211/40; 211/163; 211/121; D6/629
(58) Field of Search ........................... 211/40, 121, 1.51, 211/1.57, 163; D6/629

(56) References Cited

U.S. PATENT DOCUMENTS

| 553,109 A | | 1/1896 | Davison ...................... 211/121 |
| 579,076 A | | 3/1897 | Placier ..................... 211/121 X |
| 718,752 A | | 1/1903 | Findley ...................... 211/121 |
| 887,282 A | * | 5/1908 | Smith .......................... 211/121 |
| 887,828 A | | 5/1908 | Smith .......................... 211/121 |
| 1,008,823 A | * | 11/1911 | Hill ......................... 312/134 X |
| 1,013,015 A | * | 12/1911 | Herman ........................ 312/36 |
| 2,819,801 A | * | 1/1958 | Winkler ........................ 211/121 |
| 2,869,708 A | * | 1/1959 | Nesseth ........................ 198/158 |
| 2,912,118 A | | 11/1959 | Behrens et al. .............. 211/121 |
| 2,969,867 A | | 1/1961 | McClelland ............. 211/121 X |
| 3,141,123 A | | 7/1964 | Olson ...................... 312/268 X |
| RE25,919 E | | 11/1965 | Anders ........................ 312/268 |
| 3,428,384 A | | 2/1969 | Goldammer ................. 312/268 |
| 3,720,451 A | * | 3/1973 | Anders ........................ 312/268 |
| 3,722,743 A | * | 3/1973 | Atchley ........................ 221/77 |
| 3,786,927 A | | 1/1974 | Manheim ................... 211/40 X |
| 3,937,316 A | * | 2/1976 | Cerhardt ...................... 198/156 |
| 4,026,617 A | * | 5/1977 | Bosio et al. ................. 312/268 |
| 4,844,260 A | | 7/1989 | Jaw ............................. 206/444 |
| 4,884,691 A | | 12/1989 | Behrens et al. ............. 206/444 |
| 4,940,142 A | | 7/1990 | Behrens et al. ............. 206/444 |
| 5,103,986 A | | 4/1992 | Marlowe .................... 211/41.1 |
| 5,154,301 A | | 10/1992 | Kos ............................. 211/41 |
| 5,160,050 A | | 11/1992 | Russo .......................... 211/40 |
| 5,201,414 A | | 4/1993 | Kaszubinski ................ 206/444 |
| 5,242,060 A | | 9/1993 | Chiang et al. ........... 211/41.11 |
| 5,255,773 A | * | 10/1993 | Pollock ................... 198/347.3 |
| 5,283,603 A | | 2/1994 | Kronbauer et al. .... 211/41.1 X |
| 5,293,992 A | | 3/1994 | Warner ................... 206/444 X |

(List continued on next page.)

FOREIGN PATENT DOCUMENTS

| DE | 9206594 | | 7/1992 |
| DE | 9313107 | * | 11/1993 |
| DE | 19602585 | * | 11/1993 |
| DE | 9408242 | | 8/1994 |
| DE | 9412562 | | 10/1994 |
| DE | 19509911 | | 9/1995 |
| DE | 19602585 | | 7/1997 |

*Primary Examiner*—Robert W. Gibson, Jr.
*Assistant Examiner*—Khoa Tran
(74) *Attorney, Agent, or Firm*—Fliesler Dubb Meyer & Lovejoy LLP

(57) ABSTRACT

A motorized rack for holding the jewel cases or containers of CDs (or the CDs themselves) in a very compact manner includes a continuous loop formed of holders for the CD cases or other retainers which is driven by a pair of sprockets on which the holders are mounted for rotation. High density storage is provided by spacing the holders and their associated CD containers contiguously to one another and then removal is facilitated by allowing the holders and containers to fan out at the top the vertical tower for manual removal.

11 Claims, 10 Drawing Sheets

U.S. PATENT DOCUMENTS

| | | |
|---|---|---|
| 5,314,242 A | 5/1994 | Ludlow .................. 312/297 X |
| 5,349,331 A | 9/1994 | Sieber et al. ............. 211/40 X |
| D353,322 S | 12/1994 | Oshry et al. ............. D6/407 X |
| 5,464,091 A * | 11/1995 | Callahan et al. ......... 206/45.15 |
| 5,518,112 A | 5/1996 | Ono et al. ............... 206/308.3 |
| 5,520,279 A | 5/1996 | Lin .......................... 206/308.1 |
| 5,651,202 A | 7/1997 | Hewitt ....................... 40/605 |
| 5,672,512 A | 9/1997 | Shaw ..................... 211/121 X |
| 5,697,498 A | 12/1997 | Weisburn et al. ........ 206/308.1 |
| 5,699,905 A | 12/1997 | Hara ...................... 206/308.1 |
| 5,711,431 A | 1/1998 | Reichert ................ 211/122 X |
| 5,715,937 A | 2/1998 | Oshry et al. ............. 206/308.1 |
| 5,727,681 A | 3/1998 | Li ........................... 206/308.1 |
| 5,730,283 A | 3/1998 | Lax ........................ 206/308.1 |
| 5,765,695 A * | 6/1998 | Picciallo ...................... 211/40 |
| 5,775,491 A | 7/1998 | Taniyama ................ 206/308.1 |
| 5,823,332 A | 10/1998 | Clausen ............... 206/308.1 X |
| 5,833,062 A | 11/1998 | Yeh ..................... 206/308.1 X |
| 5,845,790 A | 12/1998 | Smith ...................... 211/41.12 |
| 5,848,688 A | 12/1998 | Paloheimo ............... 206/308.1 |
| 5,881,872 A | 3/1999 | Frick ....................... 206/308.1 |
| 6,202,861 B1 * | 3/2001 | Mah .......................... 211/40 |

\* cited by examiner

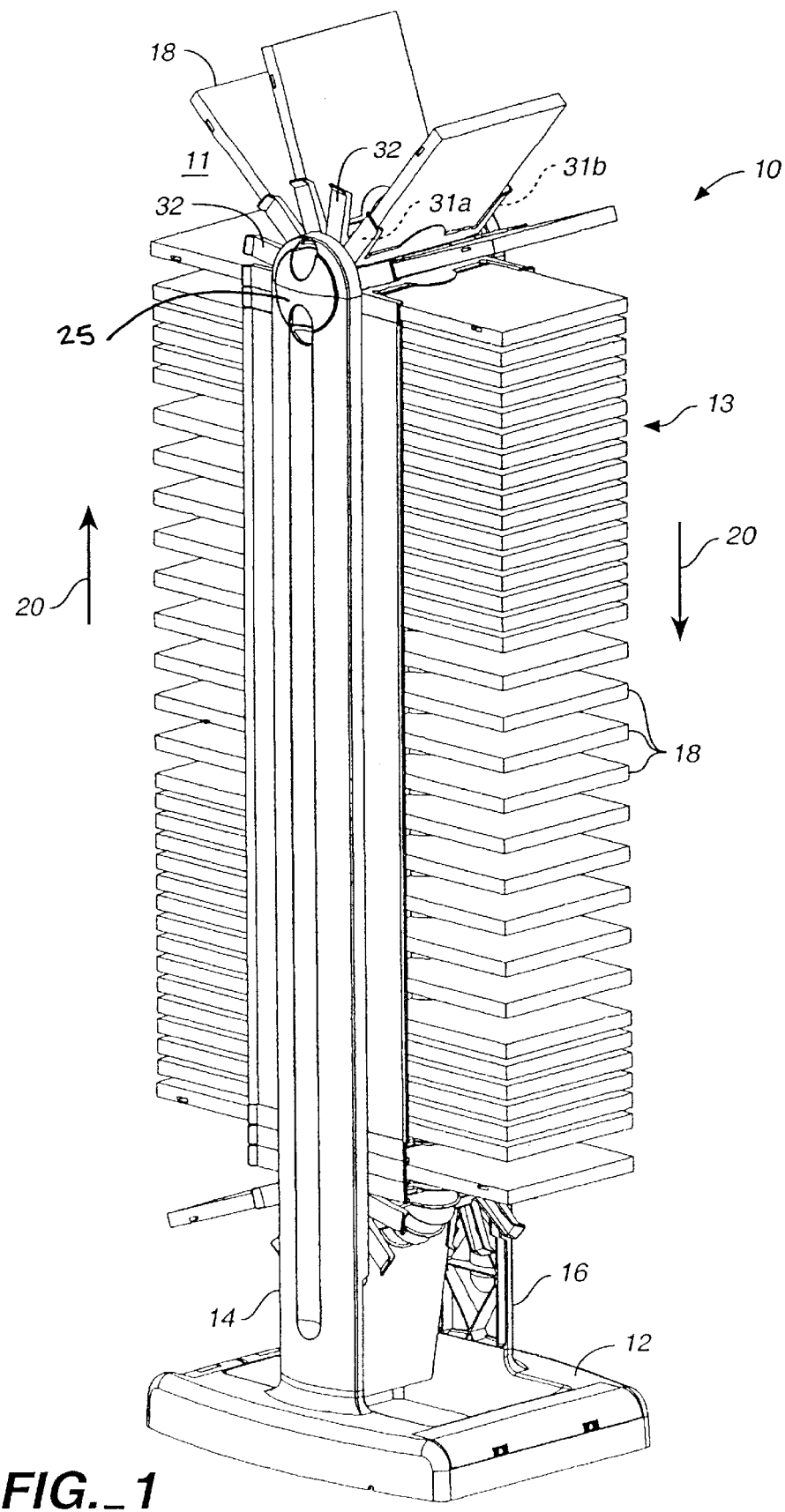
FIG._1

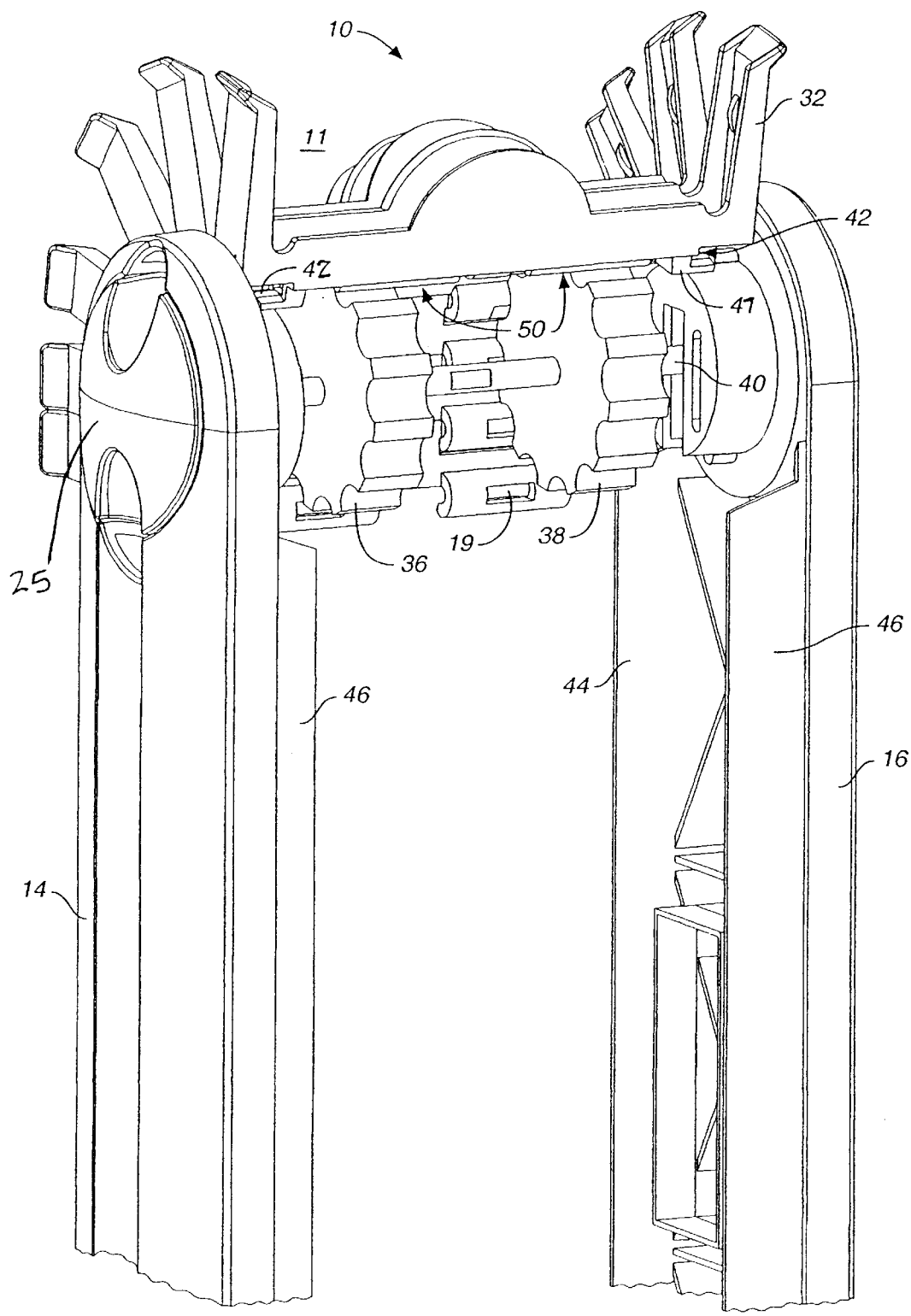
FIG._2

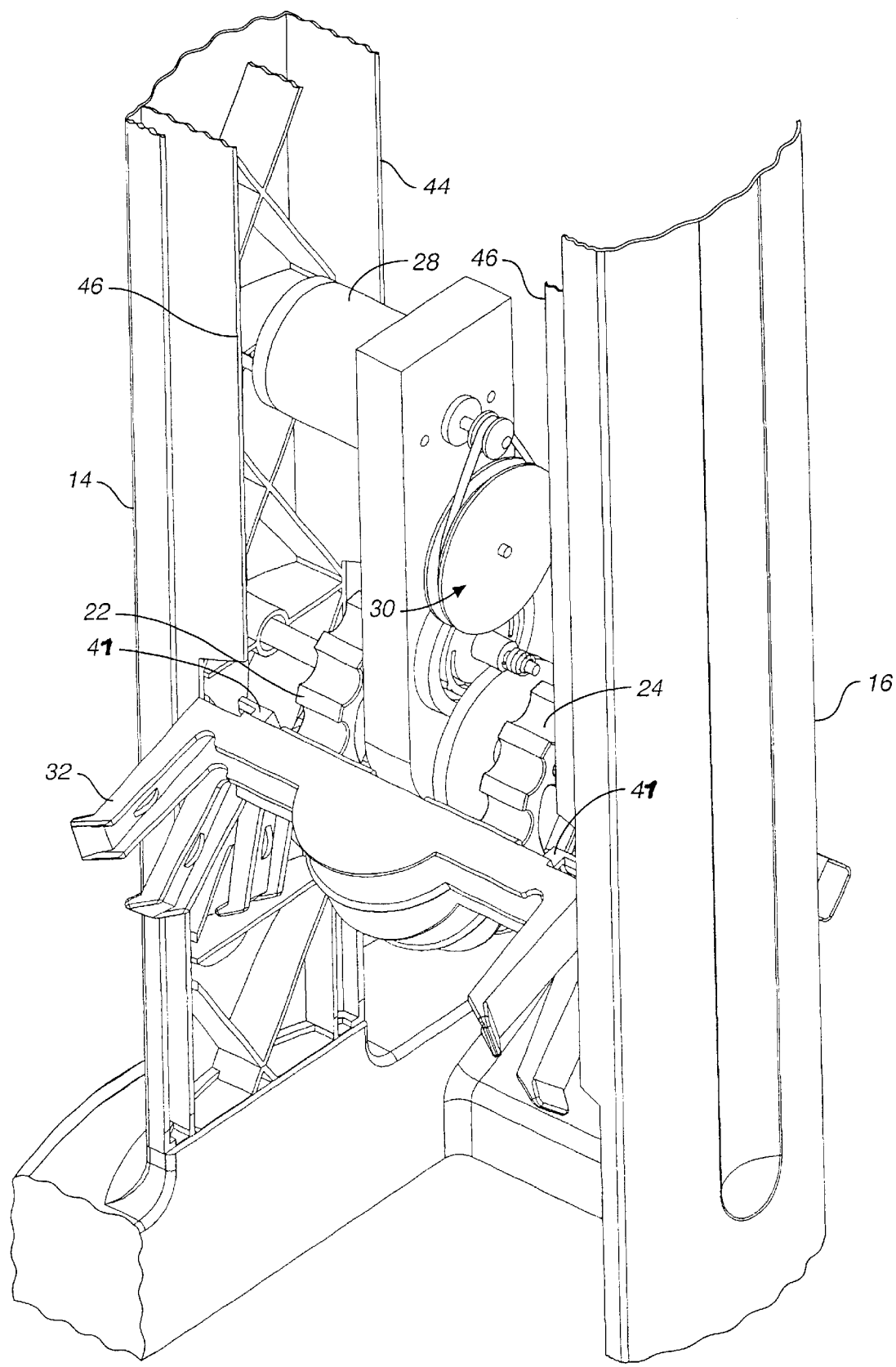
FIG._3

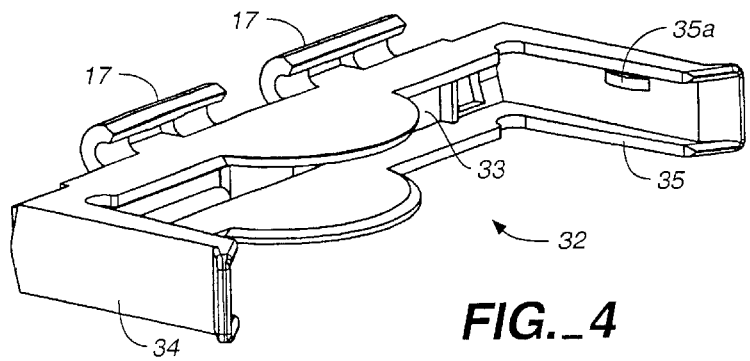
FIG._4
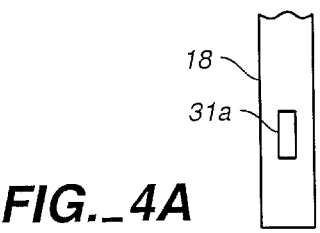
FIG._4A
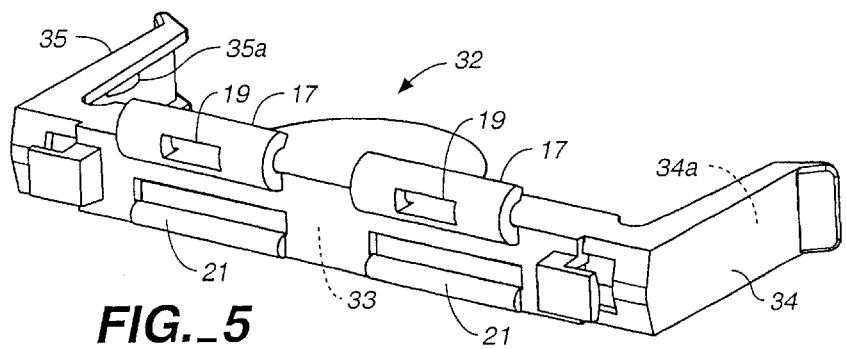
FIG._5
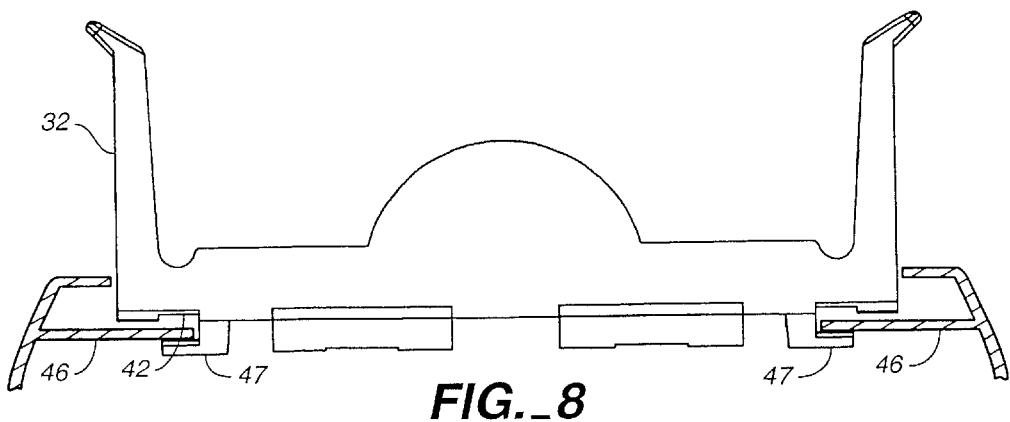
FIG._8

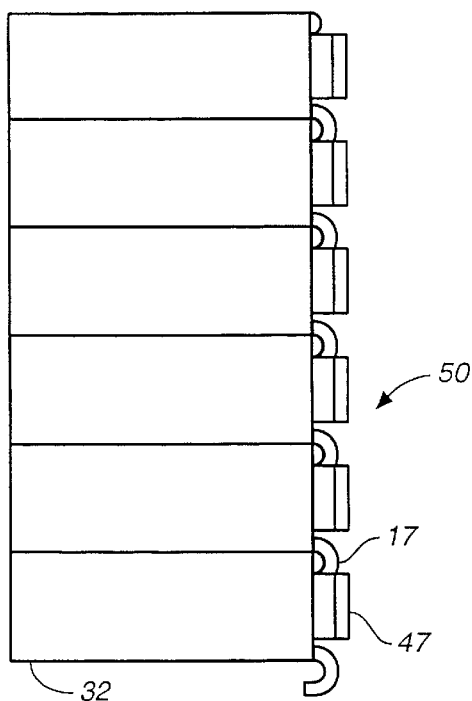
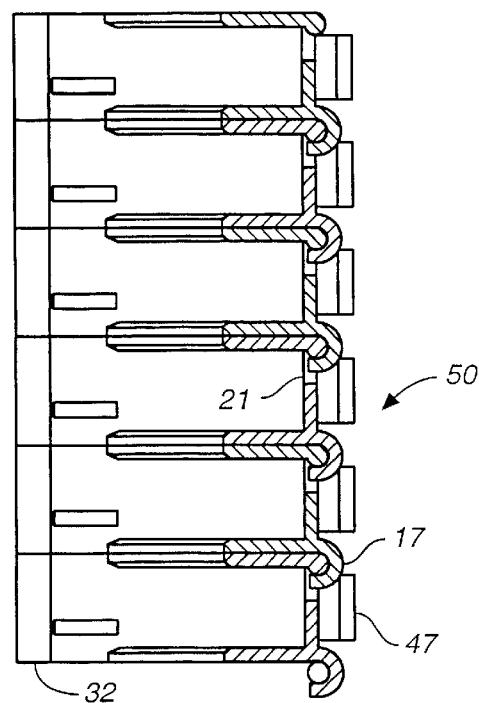
FIG._6A  FIG._6B
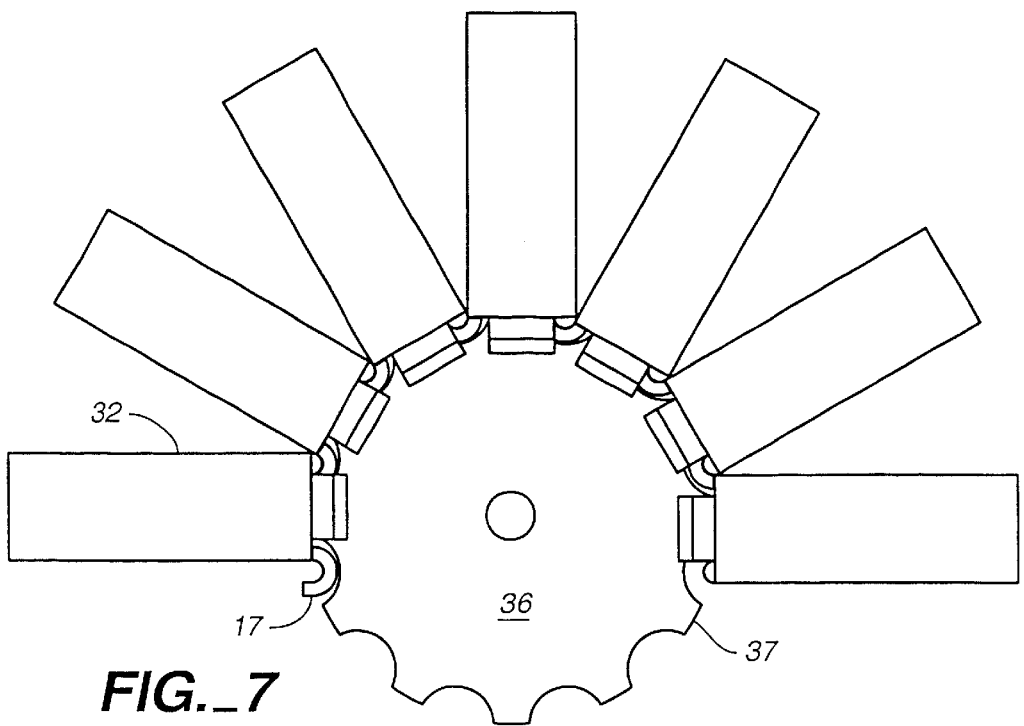
FIG._7

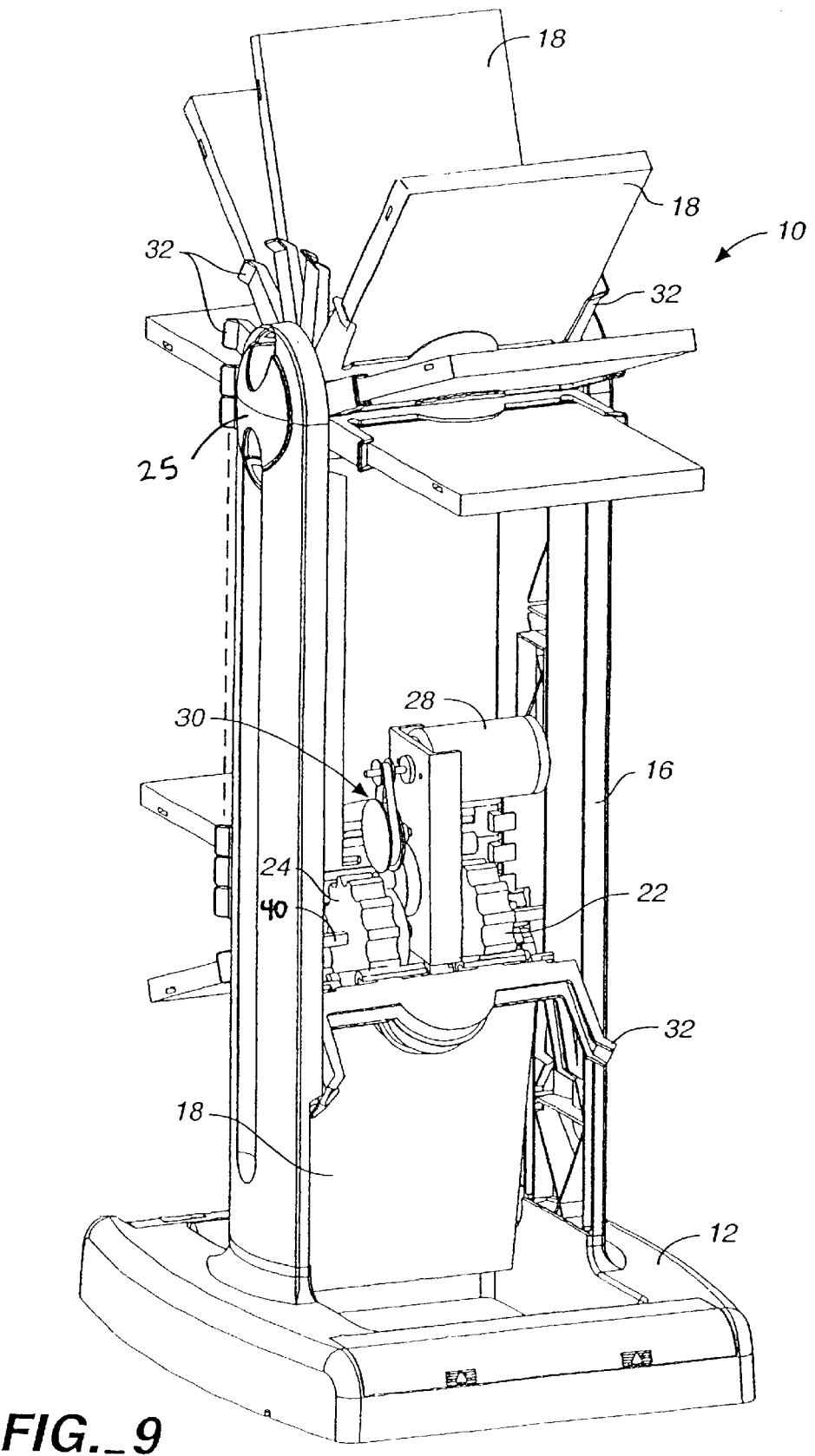
FIG._9

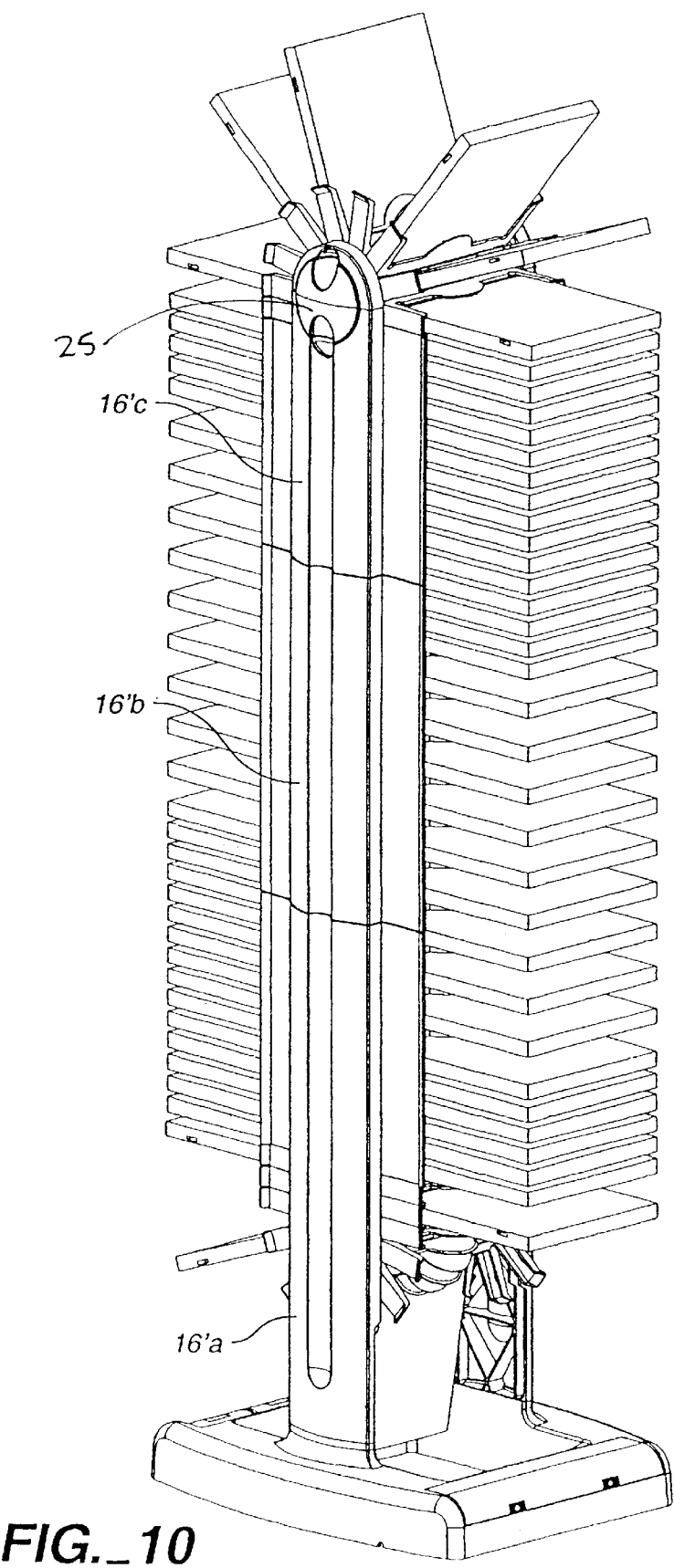
FIG._10

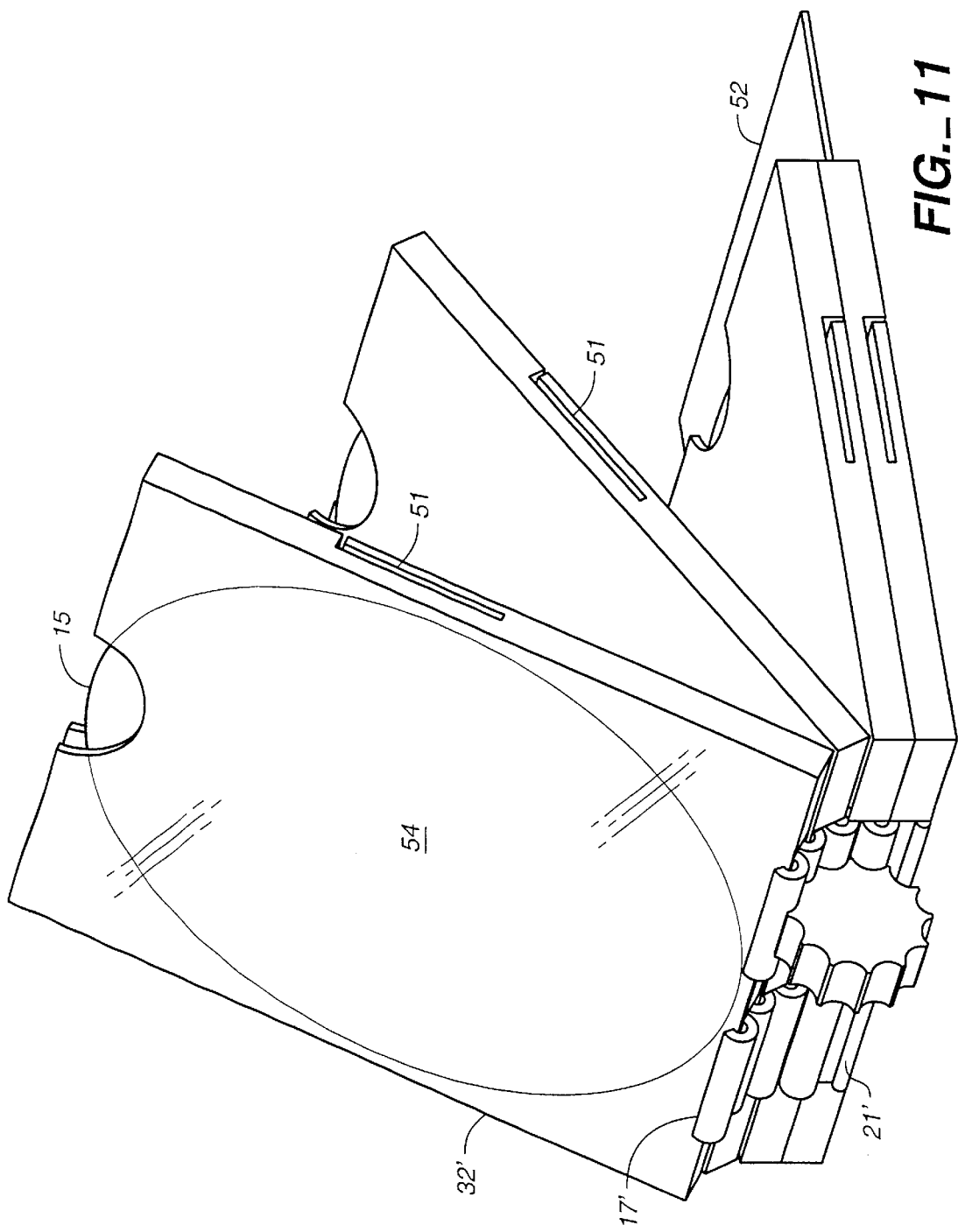

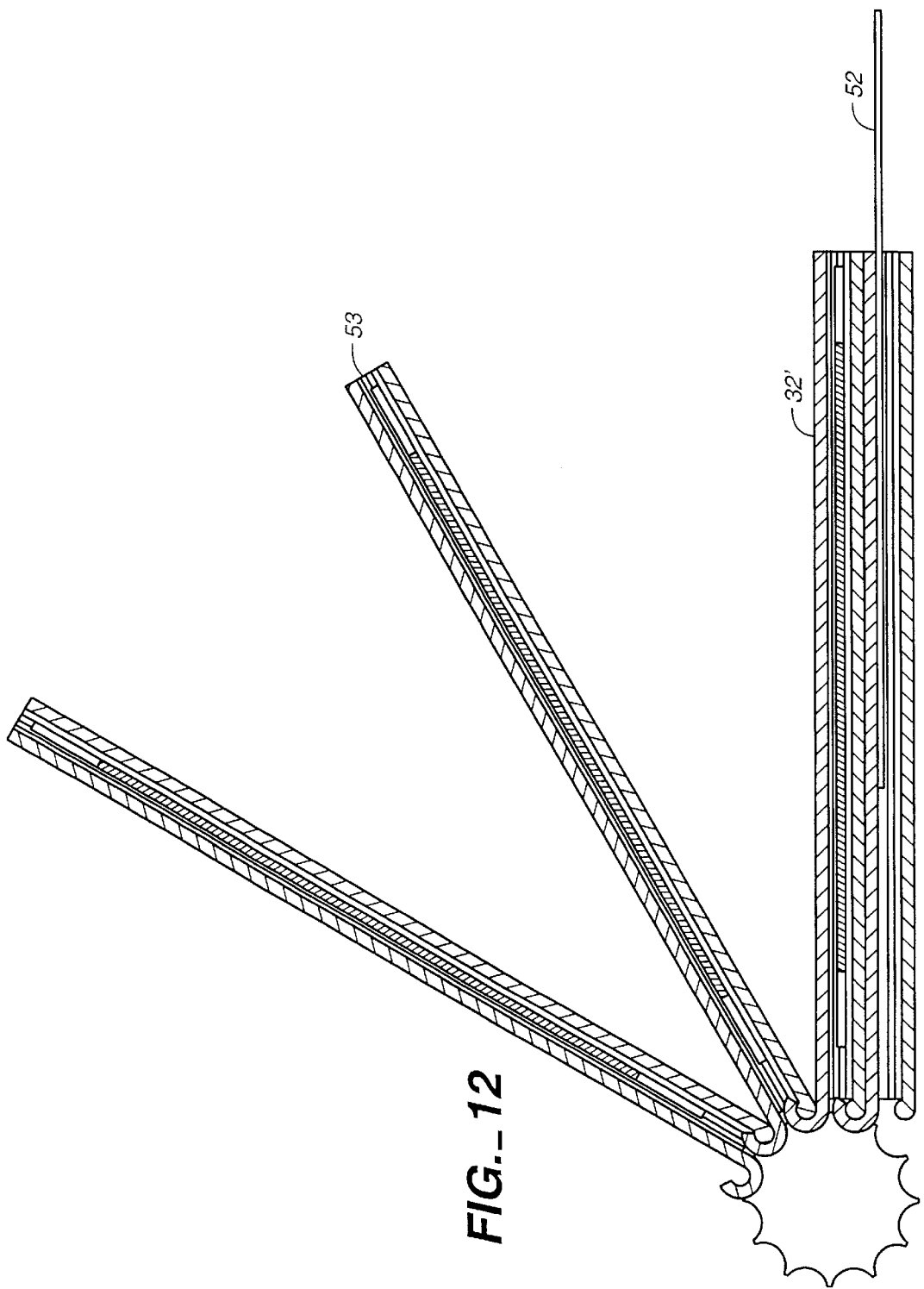

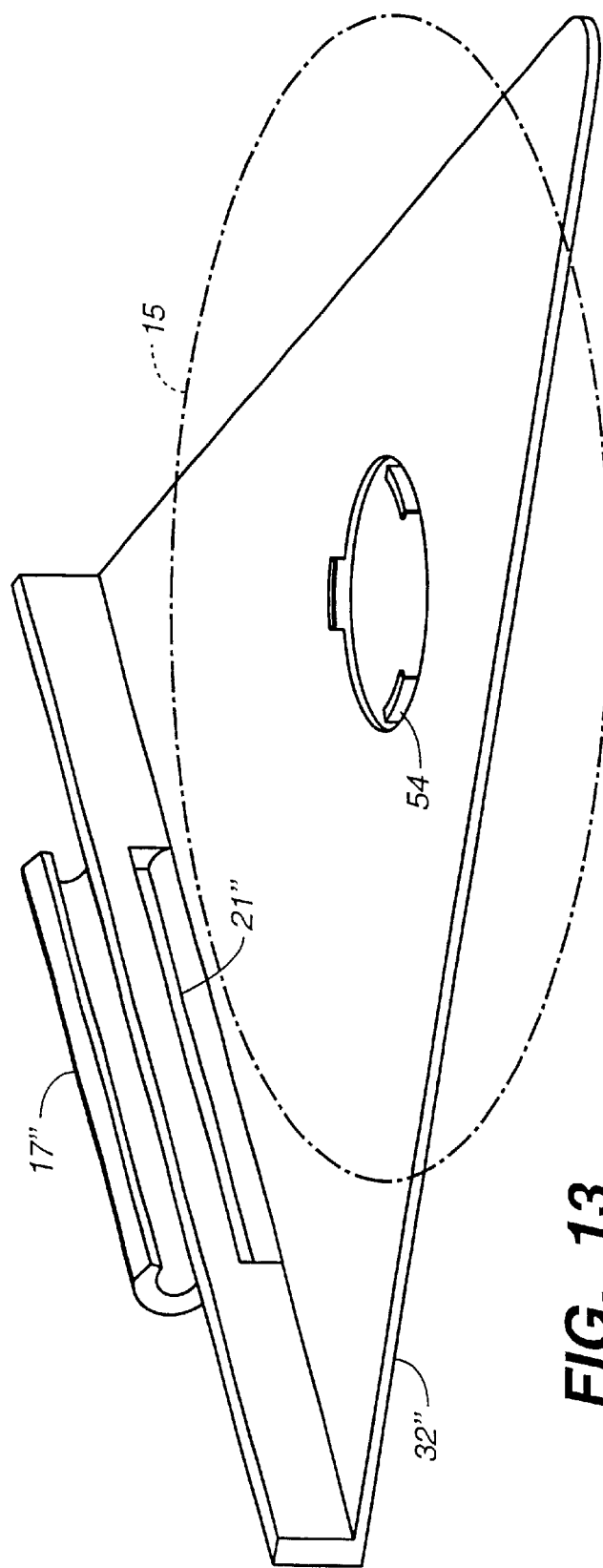
FIG._13

RACK FOR COMPACT DISCS

This is a continuation of application Ser. No. 09/240,308, filed Jan. 29, 1999 now abandoned.

INTRODUCTION

The present invention is restricted to a rack for holding objects such as compact discs and other similar items. More specifically, where the rack is a motorized storage device for holding up to 100 compact discs (CDs) in their individual containers or so called jewel cases or more than 300 when special retainers are used.

BACKGROUND

CD holders are well known which have no moving parts and which are in the form of vertical towers or horizonal cabinets. Where a large amount of CDs are stored it is difficult to physically make a selection. This is especially true for the lower part of a vertical tower. Thus it is desired to have a motorized type of CD storage device or rack to facilitate selection. It is also desirable to have a motorized rack which is very simple in design and stores the jewel cases or containers of the CDs (or the CDs themselves on retainers) in a very compact manner.

OBJECT AND SUMMARY OF INVENTION

It is therefore an object of the present invention to provide an improved rack for holding objects such as CDs.

In accordance with the above object, a rack for holding objects such as CDs comprises a plurality of holders, each holder including means for releasably retaining, by friction and/or flexible coupling, one of the objects and each holder including coupling means for joining a plurality of the holders together to form a continuous loop. Means for mounting the loop for movement are provided to convey a selected object (CD) to a position for manual selection where the object may be released from the holder.

DESCRIPTION OF PREFERRED EMBODIMENTS

FIG. 1 is a perspective view of a rack embodying the present invention.

FIG. 2 is an enlarged detailed perspective view of an upper portion of the rack of FIG. 1.

FIG. 3 is an enlarged detailed view of a lower portion of the rack of FIG. 1.

FIG. 4 is a perspective view of a holder of the present invention shown in one view.

FIG. 4A is a side view of a container which would be held by the holder of FIG. 4.

FIG. 5 is a perspective of the same holder of FIG. 4 shown in another view.

FIG. 6A is a side elevation view illustrating several holders of FIGS. 4 and 5 coupled together.

FIG. 6B is a cross-sectional view of FIG. 6A.

FIG. 7 is side elevational view illustrating the holders of FIG. 6A as they would be rotated around a sprocket.

FIG. 8 is a cross-sectional view illustrating a holder of FIGS. 4 and 5 as it would retained in the rack of FIG. 1.

FIG. 9 is a perspective view similar to FIG. 1 which has been cut away to show the interior mechanism of the rack and its operation.

FIG. 10 is a perspective view similar to FIG. 1 illustrating an alternative embodiment.

FIG. 11 is a perspective view of an alternative embodiment.

FIG. 12 is a cross-sectional view of FIG. 11.

FIG. 13 is a perspective view of an alternative embodiment.

DESCRIPTION OF PREFERRED EMBODIMENTS:

FIG. 1 is a perspective view of the rack of the present invention where several containers 18 or so called jewel boxes containing CDs are stored on a conveyer-like apparatus. The rack is a motorized device for holding up to 100 CDs in their individual jewel cases. These are linked together on an endless belt. As will be discussed later the belt is driven by an electric motor and by appropriate controls 25 may be rotated for example in a clockwise direction 20 to the top of the tower where as indicated at 11 containers are fanned out to thus facilitate their manual removal by a human hand. Normally, however, to accommodate the greatest number of containers 18 the containers are held substantially contiguous to one another (as indicated at 13) so that removal would be difficult.

The continuous loop of containers 18 is vertically mounted on a pair of opposed and spaced vertical supports 14 and 16 which are attached to a base 12. A vertical support at its upper end includes controls (not shown) for rotating in the direction 20 or the opposite direction, if desired, at either a high or low speed. All of the structure illustrated in FIG. 1 is composed of an ABS-type plastic. Objects or containers 18 are releasably retain ed by friction or by flexible coupling in the continuous storage loop shown in FIG. 1 by the holders 32.

An alternative mounting, instead of a base and vertical supports, would be affixing the loop for rotation against a wall.

A holder 32 is shown in greater detail in FIGS. 4 and 5 in different orientations and includes a slot 33 configured to receive one edge of a container 18 and a pair of fingers 34 and 35 for receiving a pair of edges of the container for releasably retaining (by friction) the container until manually selected. This is aided by the flexibility of the fingers 34 and 35 (holder 32 is constructed of ABS plastic). In addition there are a pair of projections 34a and 35b (only 35a is illustrated) for interlocking with mating slots on the container 18 which act as a flexible coupling. FIG. 4A illustrates one of these slots at 31a. Then, of course, as is illustrated in FIG. 1 there would be a second slot at 31b. These slots are formed in the jewel cases to form interior tabs to retain printed information on the CD.

Each holder 32 includes hinged coupling means allowing the holders to be flexibly coupled to one another by a hinge mechanism 50 to form a continuous loop of holders. FIGS. 6A and 6B illustrate the several holders 32 hinged together. The coupling means are also sufficiently flexible to permit turnaround of the loop on a sprocket. It is a snap together type of coupling so that the continuous loop may be easily assembled or as will be discussed later additional holders may be added to expand the capacity of the rack.

Referring now specifically to FIGS. 4 and 5, holder 32 includes first and second snap together couplings 17 and 21, preferably formed on the inward-facing surface 27 of holder 32. One coupling is of the male or ball type 21 and the other, the socket or female type 17 which as illustrated in FIGS. 4 and 5 arc placed on opposite sides of the slot-like region 33. Adjacent each male coupling 21 is a slot 25 that extends through the holder 32. The so called ball type coupling 21 is actually a cylindrical shape to snap into socket 17 of the next adjacent coupling to form hinge 50.

As shown in FIG. 6B, a snapped-together male and female coupling (from adjacent holders 32) form a hinge 50. The distal end 17a of each female coupling 17 may extend into the slot 25 when the male coupling 21 snaps into the female coupling 17. Such coupling advantageously helps holders 32 to be sufficiently flexibly interlinked so as to rotate around a sprocket 36, e.g., as shown in FIG. 7. As adjacent holders 32 rotate around the sprocket 36 and fan out, the distal end 17a of the female coupling 17 passes through the slot 25. In addition, as shown in FIGS. 6A and 6B such coupling also permits adjacent holders to maintain their physical contiguous relationship with each other when rotated into vertical up and down portions of travel. Such close relationship advantageously helps rack 10 maximize storage density. As described further with respect to FIG. 8, holder 32 preferably includes a pair of somewhat L-shaped slideable interlocks 47 that project from the inward facing surface 27 of holder 32 to define gaps or slots 42.

As shown in FIG. 7, the curved exterior of female coupling 17 normally is seated in the groove or valley 41 between the adjacent teeth 37 on sprocket 36. Besides allowing for effective engagement of a drive sprocket with the continuous loop formed by the holders 32, this type of mating engagement makes possible the fan out of the holders 32 and their associated containers at turnaround regions e.g., region 11, as illustrated in FIGS. 1, 2, 7, 9 and 10. As noted, such fan out permits a desired container 18 to be readily removed from rack 10 with a user's fingers. Slot 19 in coupling 17 is an artifact of the molding process.

Now referring to FIG. 2 and the upper portion of the tower, the drive sprockets consist of a pair of sprockets 36 and 38 which rotate on a shaft 40 which is journaled in the support towers 14 and 16. The use of a pair of sprockets gives a balanced drive to the continuous loop formed by the holders 32. To ensure sufficient tension in the loop customized bearing blocks (that act as shims) are used to mount shaft 40.

Such drive is provided as illustrated in FIG. 3 at the base of the rack or tower where a pair of lower drive sprockets 22 and 24 are driven by a motor 28 through a pulley arrangement 30. As discussed above, the drive motor 28 may be driven from a switch on a vertical support in many different modes.

To effectively guide and retain the continuous loop formed by holders 32 the side supports 14 and 16 include the rails 44 and 46 as best illustrated both in FIGS. 2 and 3. A detailed view and the operation of the rails 40 is shown in FIG. 8 where a slidable interlock unit 47 is formed on the base of each of the holders and includes the slot 42 with interlocks with the guides 46 (and also 44) to allow the holders to slide along the vertical supports, and be retained, in the vertical up and down directions. As illustrated in FIG. 2 the rails 46 and 44 terminate before the top turnaround point (and also the bottom turnaround point) to facilitate installation of the bearing blocks.

FIG. 9 illustrates the interior of the rack and effectively combines FIGS. 2 and 3 showing how the jewel cases fan out at the top portion of the rack for easy removal.

FIG. 10 illustrates a variation of FIG. 1 where the left and right vertical support members 14 and 16 are now segmented indicated as 16'a, 16'b, and 16'c; thus the tower or rack may have an additional segment 16'b added with the additional holders 32 snapped together to increase its holding capacity. Thus, a type of modular construction has been provided.

Finally, to further automate the selection of CDs, each container 18 may have a bar code strip attached to it with a bar code scanner which can automatically stop the rotation of the loop with the appropriate or selected CD at the fanned out top portion 11 as shown in FIG. 1.

In order to provide for even greater CD holding capacity customized holders 32' may be used which are in the form of a substantially square housing into which a compact disc 15 may be inserted and held by the frictional fingers 51. The bottom of each of the customized holders 32' have the same type of coupling 17', 21' as existing as the holders 32 for the jewel boxes. Since these holders or containers 32' need not be as large or durable as the jewel boxes used for commercial sale of CDs, they are typically less than one-half the thickness (that is 16 mm) of a standard CD jewel case. Thus, from a packing standpoint perhaps 250 containers may be mounted on the rack, compared to 100 standard commercial jewel cases. In addition to holding the CDs 15, there is another slotted space for promotional printed literature 52. It has a written description of the CD of course. FIG. 12 is a cross-section of FIG. 11 illustrating the extra space for the written description 52. In addition, if desired and for example as is shown at 53, each holder 32' may contain a felt wiper for wiping dust off the CD. Finally, as illustrated by the lining 54, the holders 32' are preferably transparent so that either the CD itself or the written description may appear so that the user may more easily select a appropriate disc.

FIG. 13 illustrates yet another type of holder 32" which is pie shaped and includes the couplings 17" and 21" which form a continuous loop. In the center of the pie shaped wedge 32" is a friction-type hub 54 which retains the central aperture of the CD 15. Such friction hub may appear on only one side of the retainer 32" or on both sides so that two CDs are retained. Here because the thickness has been reduced to a minimum, even greater storage is feasible.

Thus an improved rack for the storage of objects and CD jewel boxes and CDs per se have been provided.

What is claimed is:

1. A compact disc rack for storing and rotating compact disc jewel cases to a specific location at which an individual can remove the jewel case from the rack, comprising:
  a continuous loop formed from a plurality of interconnected holders, each holder comprises:
    (a) first and second walls retained a spaced-apart distance from each other and sufficiently adapted to admit at least a portion of at least one object to be retained by said holder while exposing at least a portion of a retained object for user selection and removal from said holder,
    (b) a male coupling; and
    (c) a female coupling;
  wherein a male coupling on a first said bolder is disposed to matingly interlock with a female coupling on a second said holder, and a female coupling on said first said holder is disposed to matingly interlock with a male coupling on a third said holder in forming said continuous loop;
  a first rotation shall having teeth; and
  a second rotation shaft having teeth, disposed parallel to and spaced-apart from said first rotation shaft;
  a pair of support towers spaced apart enough to allow said continuous loop to rotate between the support towers, and that supports said first and second rotation shaft;
  a base connected with the support towers;
  a drive control device that controls the rotation of said continuous loop; and wherein the drive control device is selectively adjustable to alternatively rotate the continuous loop in a clockwise and counterclockwise direction; and wherein the drive control device is located at an upper end of one of said support towers; and wherein said continuous loop engages said first and second rotation shafts so that said continuous loop is rotatable about said first rotation shaft and said second rotation shaft, and further such that said female coupling of each said holder is seated in a groove between adjacent teeth on said first and second rotation shaft as each said holder engages the first rotation shaft and as each holder engages the second rotation shaft.

2. The rack as recited in claim 1, wherein each said holder further includes a slidable interlock unit.

3. The rack as recited in claim 2, wherein said support towers fierier include guide rails that said slidable interlock unit of each said holder engages to allow said holder to slide along said guide rails vertically aligning said holders.

4. A rack according to claim 1, wherein the continuous loop rotates in the same direction that the drive control device is rotated.

5. A rack according to claim 1, wherein the continuous loop may rotate at a high and low speed.

6. A rack that retains and rotates objects, comprising;
   a continuous loop formed from a plurality of interconnected holders, each holder comprises:
      (a) first and second walls retained a spaced-apart distance from each other and sufficiently adapted to admit at least a portion of at least one object to be retained by said holder while exposing at least a portion of a retained object for user selection and removal from said holder,
      (b) a male coupling;
      (c) a female coupling; and
   wherein a male coupling on a first said holder is disposed to matingly interlock with a female coupling on a second said holder, and a female coupling on said first said holder is disposed to matingly interlock with a male coupling on a third said holder in forming said continuous loop;
   a first shaft including a sprocket wheel having teeth, that drives said continuous,loop;
   a second shaft including a sprocket wheel having teeth that provides tension within said continuous loop;
   a side support that supports at least the first shaft;
   a motor to drive said first shaft;
   a drive control device that can control the direction and speed of said continuous loop; and
   wherein the drive control device is selectively adjustable to alternatively rotate the continuous loop in a clockwise and counterclockwise direction; and
   wherein the drive control device is located at an upper end of the side support; and
   wherein said continuous loop engages said sprocket wheel of said first and second shafts so that said continuous loop is rotatable about said first shaft and said second shaft, and further such that said female coupling of each said holder is seated in a groove between adjacent teeth as each said holder engages said sprocket wheel of said first shaft and as each holder engages said sprocket wheel of said second shaft.

7. A rack that retains and rotates objects, comprising:
   a continuous loop formed from a plurality of interconnected holders, each holder comprises:
      (a) first and second walls retained a spaced-apart distance from each other and sufficiently adapted to admit at least a portion of at least one object to be retained by said holder while exposing at least a portion of a retained object for user selection and removal from said holder;
      (b) a male coupling;
      (c) a female coupling having an interior surface and an exterior surface; and
   wherein said interior surface of said female coupling on a first said bolder is disposed to matingly interlock with a male coupling on a second said holder, and a male coupling on said first: said holder is disposed to matingly interlock with said interior surface of said female coupling on a third said holder in forming said continuous loop;
   a first shaft including a sprocket wheel having teeth;
   a second shaft including a sprocket wheel having teeth;
   a side support that supports at least the first shaft;
   a drive control device that controls the direction and speed of said continuous loop; and
   wherein the drive control device is selectively adjustable to alternatively rotate the continuous loop in a clockwise and counterclockwise direction; and
   wherein the drive control device is located at an upper end of the side support; and
   wherein said continuous loop engages said sprocket wheel of said first and second shafts so that said continuous loop is rotatable about said first shaft and said second shaft, and further such that said exterior surface of said female coupling of each said holder is seated in a groove between adjacent teeth as each said holder engages said sprocket wheel of said first shaft and as each bolder engages said sprocket wheel of said second shaft.

8. The rack as recited in claim 7, wherein the control device controls the direction and speed of said continuous loop.

9. A rack that retains and rotates objects, comprising:
   a continuous loop formed from a plurality of interconnected holders, each holder comprises:
      (a) first and second walls retained a spaced-apart distance from each other and adapted to admit at least a portion of at least one object to be retained by said holder while exposing at least a portion of a retained object for user selection and removal from said holder;
      (b) a male coupling;
      (c) a female coupling having an interior surface and an exterior surface; and
   wherein said interior surface of said female coupling on a first said holder is disposed to matingly interlock with a male coupling on a second said holder, and a male coupling on said first said holder is disposed to matingly interlock with said interior surface of said female coupling on a third said holder in forming said continuous loop;
   a shaft including a sprocket wheel having teeth;
   a side support that supports the shaft;
   a drive control device that can control the direction and speed of said continuous loop; and
   wherein the drive control device is selectively adjustable to alternatively rotate the continuous loop in a clockwise and counterclockwise direction; and wherein the drive control device is located at an upper end of the side support; and wherein said continuous loop engages said sprocket wheel of said shaft so that said continuous loop is rotatable about said shad and further such that said exterior surface of said female coupling of each said holder is seated in a groove between adjacent teeth as each said holder engages said sprocket wheel of said shaft.

10. A compact disc rack for storing and rotating compact disc jewel cases to a specific location at which an individual can remove the jewel case from the rack, comprising:

a continuous loop formed from a plurality of interconnected holders, each holder comprises:
(a) first and second walls retained a spaced-apart distance from each other and sufficiently adapted to admit at least a portion of at least one object to be retained by said holder while exposing at least a portion of a retained object for user selection and removal from said holder;
(b) a male coupling;
(c) a female coupling; and
wherein a male coupling on a first said holder is disposed to matingly interlock with a female coupling on a second said holder, and a female coupling on said first said holder is disposed to matingly interlock with a male coupling on a third said holder in forming said continuous loop;

a rotation shaft having teeth; and a pair of support towers spaced apart enough to allow said continuous loop to rotate between the support towers, and that supports said rotation shaft;

a base connected with the support towers, a drive control device that controls the rotation of said continuous loop, and wherein the drive control device is selectively adjustable to alternatively rotate the continuous loop in a clockwise and counterclockwise direction; and wherein the drive control device is located at an upper end of one of said support towers; and wherein said continuous loop engages said rotation shaft so that said continuous loop is rotatable about said rotation shaft, and further such that said female coupling of each said holder is'seated in a groove between adjacent teeth on said rotation shaft as each said holder engages the rotation shaft.

11. A rack that retains and rotates objects, comprising:

a continuous loop formed from a plurality of interconnected holders, each holder comprises;
(a) a structure adapted to admit at least a portion of at least one object to be retained by said holder while exposing at least a portion of a retained object for user selection and removal from said holder;
(b) a male coupling;
(c) a female coupling having an interior surface and an exterior surface; and
wherein said interior surface of said female coupling on a first said holder is disposed to matingly interlock with a male coupling on a second said holder, and a male coupling on said first said holder is disposed to matingly interlock with said interior surface of said female coupling on a third said holder in forming said continuous loop;

a shaft including a sprocket wheel having teeth;

a side support that supports the shaft;

a drive control device that can control the direction and speed of said continuous loop; and wherein the drive control device is selectively adjustable to alternatively rotate the continuous loop in a clockwise and counterclockwise direction; and wherein the drive control device is located at an upper end of the side support; and wherein said continuous loop engages said sprocket wheel of said shaft so that said continuous loop is rotatable about said shaft, and further such that said exterior surface of said female coupling of each said holder is seated in a groove between adjacent teeth as each said holder engages said sprocket wheel of said shaft.

* * * * *

UNITED STATES PATENT AND TRADEMARK OFFICE
CERTIFICATE OF CORRECTION

PATENT NO. : 6,520,347 B2
DATED : February 18, 2003
INVENTOR(S) : David Caplan et al.

It is certified that error appears in the above-identified patent and that said Letters Patent is hereby corrected as shown below:

Drawings,
Sheet 1, Fig. 1, the handwritten reference numeral 25 pointing to the controls should be 37 as shown below.

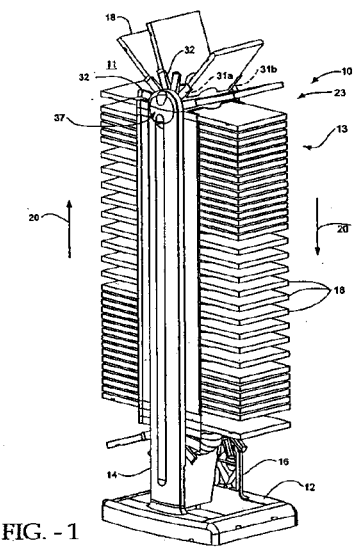
FIG. - 1

Sheet 2, Fig. 2, the handwritten reference numeral 25 pointing to the control should be changed to 37 as shown below.
Fig. 2, the hand corrected reference numeral 42 pointing to the slot was formally typeset as shown below.
Fig. 2, reference numeral 25 pointing to the slidable interlock should be 47 as shown below.

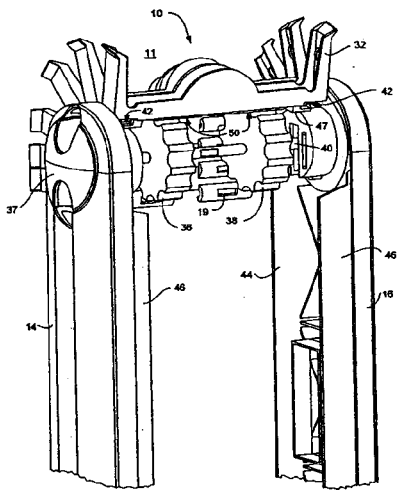
FIG. - 2

UNITED STATES PATENT AND TRADEMARK OFFICE
CERTIFICATE OF CORRECTION

PATENT NO.    : 6,520,347 B2
DATED         : February 18, 2003
INVENTOR(S)   : David Caplan et al.

It is certified that error appears in the above-identified patent and that said Letters Patent is hereby corrected as shown below:

Drawings, (Cont.)
Sheet 3, Fig. 3, the reference numeral 26 pointing to the shaft should be inserted as shown below.
Fig. 3, the handwritten reference numerals 41 pointing to the slidable interlock on either side should be 47 as shown below.

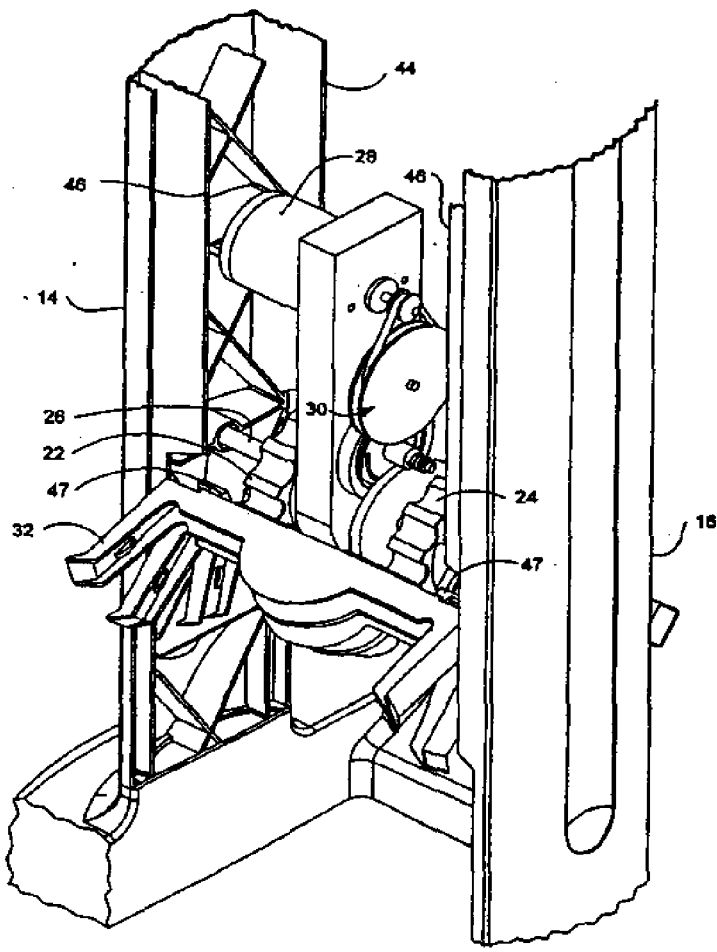

FIG. - 3

UNITED STATES PATENT AND TRADEMARK OFFICE
CERTIFICATE OF CORRECTION

PATENT NO. : 6,520,347 B2
DATED : February 18, 2003
INVENTOR(S) : David Caplan et al.

It is certified that error appears in the above-identified patent and that said Letters Patent is hereby corrected as shown below:

Drawings, (Cont.)
Sheet 4, Fig. 4, the reference numeral 17a pointing to the distal end should be inserted on either side as shown; the reference numeral 25 pointing to the slot should be inserted on either side as shown below.
Fig. 5, the reference numeral 17a should be pointing to the distal end should be inserted on either side as shown; the reference numeral 25 pointing to the slot should be inserted on either side as shown; the reference numeral 47 should be inserted on either side of the slidable interlock as shown below.
Fig. 8, the reference numeral 14 pointing to the left vertical support should be inserted as shown; the reference numeral 16 pointing to the right vertical support should be inserted as shown below.

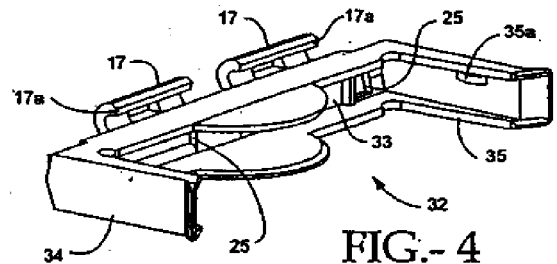
FIG.- 4

FIG.- 4A

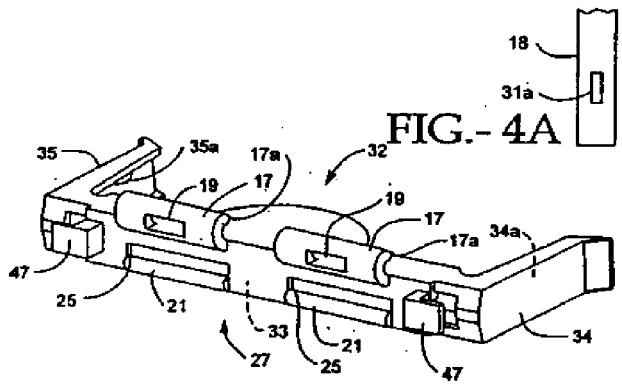
FIG.- 5

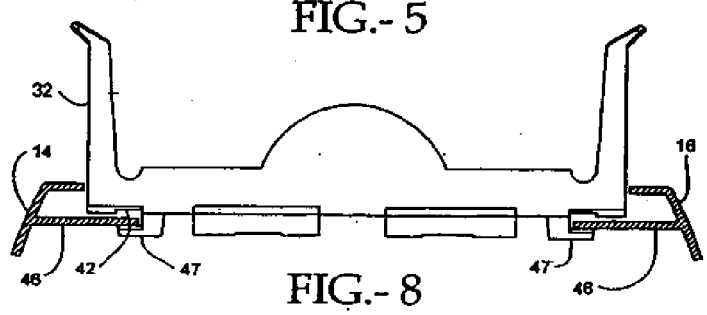
FIG.- 8

UNITED STATES PATENT AND TRADEMARK OFFICE
CERTIFICATE OF CORRECTION

PATENT NO.    : 6,520,347 B2
DATED         : February 18, 2003
INVENTOR(S)   : David Caplan et al.

It is certified that error appears in the above-identified patent and that said Letters Patent is hereby corrected as shown below:

Drawings, (Cont.)
Sheet 5, Fig. 6A, the reference numeral 17a pointing to the distal end should be inserted as shown below.
Fig. 6B, the reference numeral 21 pointing to the male coupling should be inserted as shown; the reference numeral 21 pointing to the slot should be 25 as shown; the reference numeral 17a pointing to distal end should be inserted as shown below.
Fig. 7, the reference numeral 17a pointing to the distal end should be inserted as shown; the reference numeral 41 pointing to the groove or valley should be inserted on either side as shown on the diagram below.

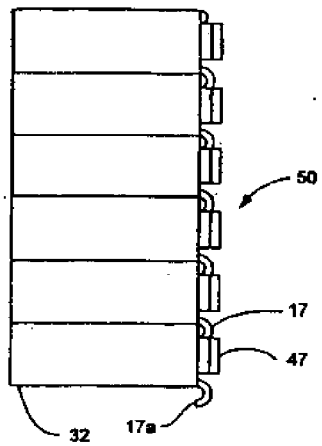
FIG. -6A

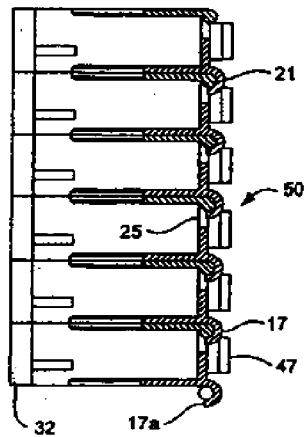
FIG.- 6B

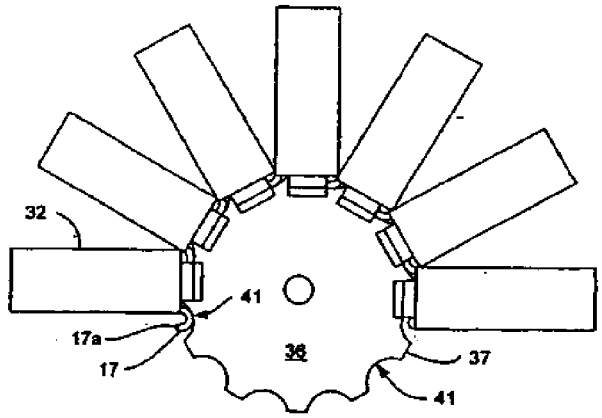
FIG.- 7

UNITED STATES PATENT AND TRADEMARK OFFICE
CERTIFICATE OF CORRECTION

PATENT NO.   : 6,520,347 B2
DATED        : February 18, 2003
INVENTOR(S)  : David Caplan et al.

It is certified that error appears in the above-identified patent and that said Letters Patent is hereby corrected as shown below:

Drawings, (Cont.)
Sheet 6, Fig. 9, the underlined reference numeral 11 describing the complete CD rack diagram should be added (as shown on the diagram); the handwritten reference numeral 25 pointing to the control should be changed to 37 as shown; the reference numeral 23 with an arrow pointer should be added (as shown on the diagram); the reference numeral 40 should be changed to 26 as shown below.

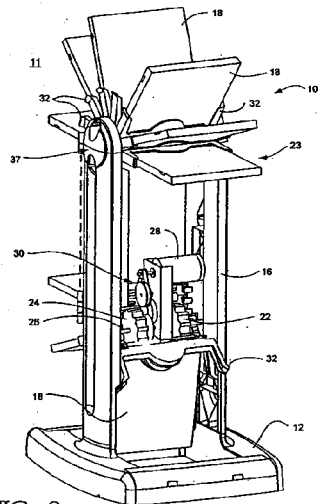

FIG.- 9

Sheet 7, Fig. 10, the reference numeral 37 should be added to the diagram (as shown on the diagram) below.

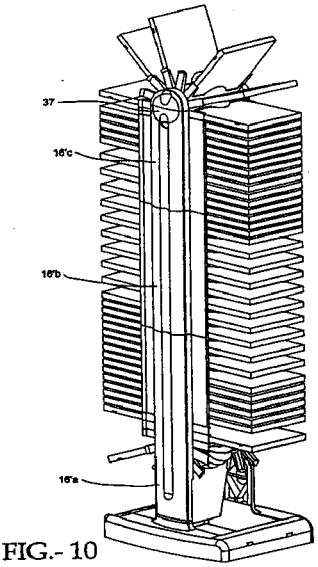

FIG.- 10

UNITED STATES PATENT AND TRADEMARK OFFICE
CERTIFICATE OF CORRECTION

PATENT NO.   : 6,520,347 B2
DATED        : February 18, 2003
INVENTOR(S)  : David Caplan et al.

It is certified that error appears in the above-identified patent and that said Letters Patent is hereby corrected as shown below:

Column 2,
Line 15, change reference numeral "25" to -- 37 --

Column 3,
Line 6, change the word "malc" to -- male --

Column 4,
Line 53, change the word "bolder" to -- holder --
Line 59, change the word "shall" to -- shaft --

Column 5,
Line 17, change the word "fierier" to -- further --
Line 44, delete the comma "," between the words -- continuous look --

Column 6,
Line 11, change the word "bolder" to -- holder --
Line 13, delete the colon ":" between the words "first said"
Line 36, change the word "bolder" to -- holder --

Column 7,
Line 5, change the word "shad" to -- shaft --

Column 8,
Line 4, delete the apostrophe " ' " between the words "further"

Signed and Sealed this

Fourth Day of January, 2005

JON W. DUDAS
*Director of the United States Patent and Trademark Office*